(12) United States Patent
Bergaire et al.

(10) Patent No.: US 6,665,319 B1
(45) Date of Patent: Dec. 16, 2003

(54) CIRCUIT SWITCHING DEVICE IN A TELECOMMUNICATION NETWORK

(75) Inventors: André Bergaire, Montigny le Bretonneux (FR); Germain Oliver, Courcouronnes (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/433,284

(22) Filed: Nov. 3, 1999

(30) Foreign Application Priority Data

Nov. 5, 1998 (FR) .......................................... 98 13920

(51) Int. Cl.$^7$ ................................................ H04J 3/04
(52) U.S. Cl. ...................................... 370/535; 370/352
(58) Field of Search ................................ 370/535, 536, 370/537, 538, 539, 540, 541, 542, 360, 465, 468, 532, 545

(56) References Cited

U.S. PATENT DOCUMENTS 5,640,387 A    6/1997   Takahashi et al.

OTHER PUBLICATIONS

N. Puritscher, "Der Direkte Draht Zum Kunden", NTZ Nachrichtentechnische Zeitschrift, vol. 50, No. 11, Jan. 1, 1997, p. 60/61.
Fujita Hiroyuki et al, "Sonet–Fiber Optic Transmission Systems", Hitachi Review, vol. 44, No. 4, Aug. 1, 1995 pp., 187–192 XP000550267.
T. Andersen, "Effiziente Ubertragung Im Teilnehmeranschlussnetz Mit Filt 4×2", Tec. Das Technische Magazin Von Ascom, No. 1, Jan. 1, 1994, pp., 32–35 XP000474681.

Primary Examiner—Douglas Olms
Assistant Examiner—Ricardo M. Pizarro
(74) Attorney, Agent, or Firm—Sughrue Mion, PLLC

(57) ABSTRACT

To provide a high bit rate link between telecommunication network users, HDSL modems are installed on the user premises and at corresponding subscriber line termination units in an exchange. The modems in the exchange are connected to access units of the exchange which include networks of add and drop multiplexers interconnected in a ring and connected to a drop port. It is shown that it is a simple matter to organize dynamic switching between users connected to the same access unit or neighboring access units in the same exchange. Other calls are routed to other exchanges.

14 Claims, 2 Drawing Sheets

CIRCUIT SWITCHING DEVICE IN A TELECOMMUNICATION NETWORK

BACKGROUND OF THE INVENTION

1. Field of the Invention

The present invention consists in a circuit switching device for use in a telecommunication network, in particular a public telecommunication network, although the device could find an application in a private telecommunication network. One object of the invention is to provide users with high bit rate digital traffic channels, typically at bit rates in the order of 2 Mbit/s and above, to enable each user to communicate with the others at a high bit rate, on demand, on a call by call basis.

2. Description of the Prior Art

Data transmission systems using modems of the conventional network are conventional in the telephony art. In the current state of the art, such modems offer a maximum bit rate of 56 kbit/s. The required bit rates referred to above therefore cannot be provided with such modems. However, this type of link has the advantage that it can be set up on demand, on a point-to-point and call by call basis.

Another solution to the problem of transporting digital information (possibly digitized speech or images) on demand consists in using digital networks conforming to the ISDN standard, in which each channel offers a bit rate of 64 kbit/s. In this case, users are offered two types of access. A first type of access provides two channels at 64 kbit/s. A second type of access provides 30 channels at 64 kbit/s. The second type offers bit rates approaching the required bit rate. However, the 30 channels are independent of each other. Essentially, this means that there can be different transmission delays from one channel to another. Consequently, even if users choose to divide messages between the 30 channels, they cannot be easily recovered at the receiving end without using reorganization circuits whose complexity is exorbitant given the huge number of permutations of the order of arrival of the 30 channels.

In France, the France Télécom network provides high bit rate (e.g. 2 Mbit/s) TRANSFIX lines. The same type of link is used between telephone exchanges or between paris of telephone exchanges. Given the stated object of the invention, these links have the disadvantage that they are not set up on demand, on a call-by-call basis, and must be reserved well in advance. They cannot be changed immediately when the user's requirements change. These leased lines provide only fixed point-to-point links, in contrast to the previous two possibilities.

A third generation solution uses ADSL (Asymmetric Digital Subscriber Line) techniques. These techniques are mainly used in the Internet. They entail downloading information from data servers to users at a high bit rate, typically in the order of 2 Mbit/s and above. In the uplink direction, which normally carries queries from users to the network, the bit rate is much lower. It is limited to 128 kbit/s, for example. In this case the link is effectively of the call by call type, but is asymmetric in terms of the bit rates offered.

An object of the invention is to remedy the above drawbacks and to propose a solution in which any user can, on demand, obtain access to a channel providing a high bit rate in both directions for communicating with any other user. The basic idea of the invention is to use existing access and information transport equipment. The existing equipment is used to construct a high bit rate telecommunication network and associated switching circuits. The switching circuits provide each public switched network user with high bit rate (typically 2 Mbit/s and above) full duplex symmetrical access. This means that the copper wire pairs connecting a domestic user will continue to be used at least for access at bit rates up to 2 Mbit/s. It also means that the some service possibilities will be retained: charging mode, special services, on demand access.

To solve the above problems, the invention concerns a circuit switching device in which add and drop multiplexer rings organize local distribution of information as soon as possible within the switching hierarchy, at least at lower levels of the hierarchy. If all users were offered a high bit rate link, they would use the high bit rates. Consequently, the number of bits to be processed by the switching network could increase excessively. To avoid the need to manage all of the distributed information in a central unit, switching is organized hierarchically so that only traffic which is not local and which necessitates inter-regional or even inter-continental links is forwarded to distribution centers higher in the hierarchy.

The invention performs the switching in the rings, which therefore provide dynamic circuit switching. To this end the rings are controlled by control signals resulting from real time interpretation of signaling used to set up a call and normally transmitted by a caller.

SUMMARY OF THE INVENTION

The invention consists in a circuit switching system in a telecommunication network including an exchange, a set of access units each of which has a primary ring of add and drop primary multiplexers each of which is connected to user equipment units and control means for the primary multiplexers which include means for receiving signaling transmitted by a user equipment unit connected to the access units, and means for producing routing signals corresponding to the signaling, the routing signals constituting control signals for the primary multiplexers of the set of access units for setting up a connection between the subscriber equipment unit and another subscriber equipment unit.

The invention will be better understood after reading the following description and referring to the accompanying drawings. The drawings are provided by way of illustration only and are in no way limiting on the invention.

DETAILED DESCRIPTION OF THE PREFERRED EMBODIMENT

Figure 1:
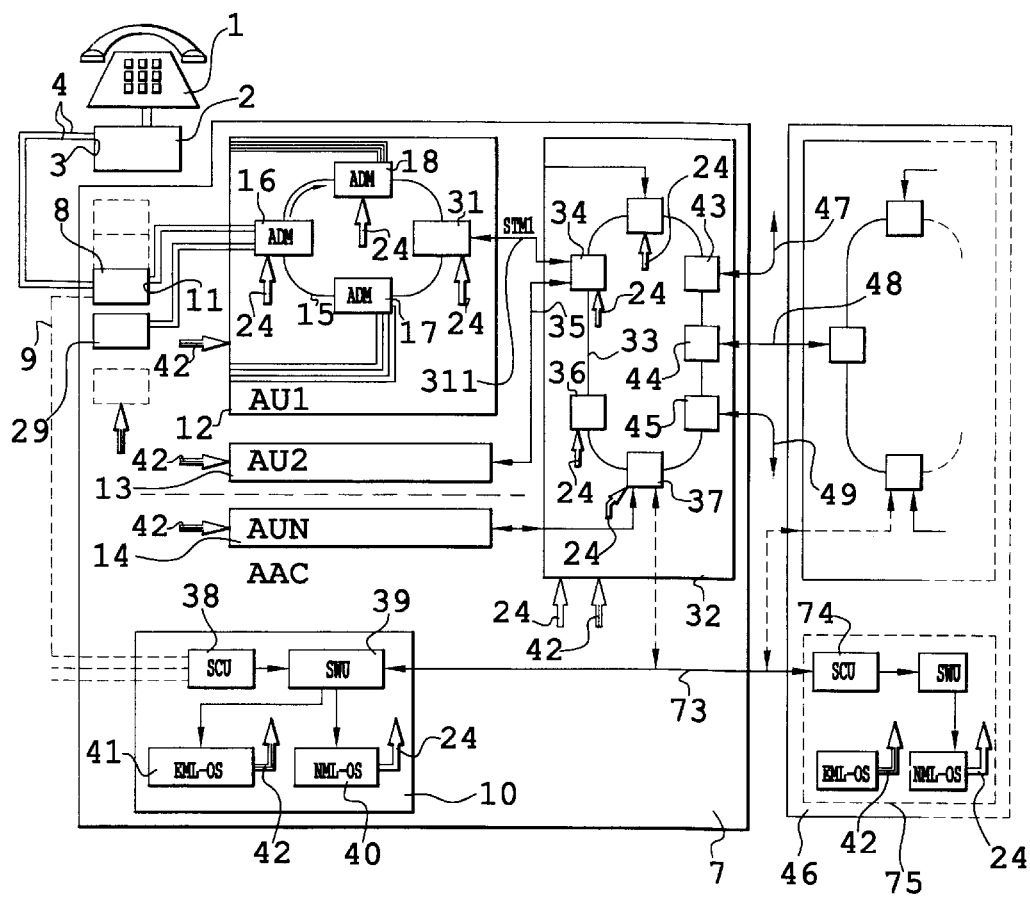
FIG. 1 is a block diagram of a circuit switching device of the invention used in a telecommunication network.

FIG. 1 shows a circuit switching device in accordance with the invention used in a telecommunication network. In this network, a user has a user equipment unfit 1, symbolized here as a telephone, for access to the network. In a practical implementation, a high bit rate modem 2 is installed on the users premises. In one example the high bit rate is 2 Mbit/s. The modem is of a HDSL (High bit rate Digital Subscriber Line) modem and essentially has two types of ports on the user side. A first port is used to receive and transmit call data. A second port is used to receive and transmit signaling, in particular to receive a ringing signal or a signal with the same function and to transmit dialing signals and paging signals.

On the network side, the modem 2 has a port 3 connected to a copper wire pair 4. Information exchanged by the users enters and leaves via the port 3. The port 3 therefore conveys bits that the user transmits to another user or receives from another user. The port 3 also carries signaling. The signaling indicates the identity (for example the location or the telephone number) of the user of the equipment unit 1 that sent the message. The signaling also and most importantly includes destination signals, essentially the telephone number of another user that the user of the equipment unit 1 is trying to call. The signaling received includes ringing signals and, more generally, signals which ready the equipment unit 1 to receive bits sent to it.

The signaling is sent to an exchange of the downstream telephone network. The signaling transmission channel preferably uses the pair 4 so that there is no need to modify the infrastructure. The signaling is sent at the start of the call, for example. In this case, the circuits of the modem 2 are adapted to recognize signaling within the frame of the signals transmitted and to act accordingly. The protocol in accordance with which the modem operates remains exactly the same. However, there are now two sessions: a very short first session in which the modem transmits the signaling over the pair 4, and then a second session, which lasts as long as required, in which the user of equipment unit 1 transmits information.

In an exchange 7 of the downstream telecommunication network, the first modem 2 is connected by the wires 4 to a second high bit rate modem 8 of the same type as the modem 2. The modem 8 performs two operations. Firstly, it transmits signaling received via a channel 9 to a control circuit 10 which processes the signaling. Secondly, it receives the information that the user of the equipment unit 1 wishes to exchange with another user, corresponding to the second session of the call. To this end, the modem 8 demodulates the information transmitted in modulated form by the modem 2 over the line 4 and provides the information at 2 Mbit/s transmitted by the equipment unit 1 at its output 11, on two wires or n wires, for example G.703 type wires.

The exchange 7 includes at least one access unit 12, denoted AU1, to receive the signals from the outputs 11 of the modems 8 in the exchange 7. To give priority to managing local calls, the exchange 7 includes a number of access units, for example 48 access units AU1 through AUN here denoted 12 through 14. It could comprise more such units. The purpose of the exchanges is to distribute local calls so that calls which can be switched locally are not routed to an exchange at a higher level in the hierarchy.

An access unit in accordance with the invention is essentially provided with a primary ring 15 of multiplexers referred to herein as primary multiplexers. Thus the ring 15 interconnects a number of primary multiplexers. In a preferred example, it interconnects three primary multiplexers 16 through 18. The ring 15 is a channel interconnecting the primary multiplexers. To simplify the explanation at this stage, the multiplexers 16 through 18 are duplex add and drop multiplexers (ADM). The input and output of each primary multiplexer can be connected to a number of communication channels from the modem 8. In one example each multiplexer 16 through 18 can receive 63 calls and is therefore in practise connected to 63 modems 8.

The reason for installing three multiplexers on a primary ring 15 is related to local statistical busying rates. If habits change at particular locations, the number of multiplexers 16 through 18 on a ring 15 and/or the bit rate of the ring can be changed. In particular, the bit rate can be modified by modifying the protocol used on the ring.

In one example the multiplexers 16 through 18 perform time-division switching.

Figure 2:
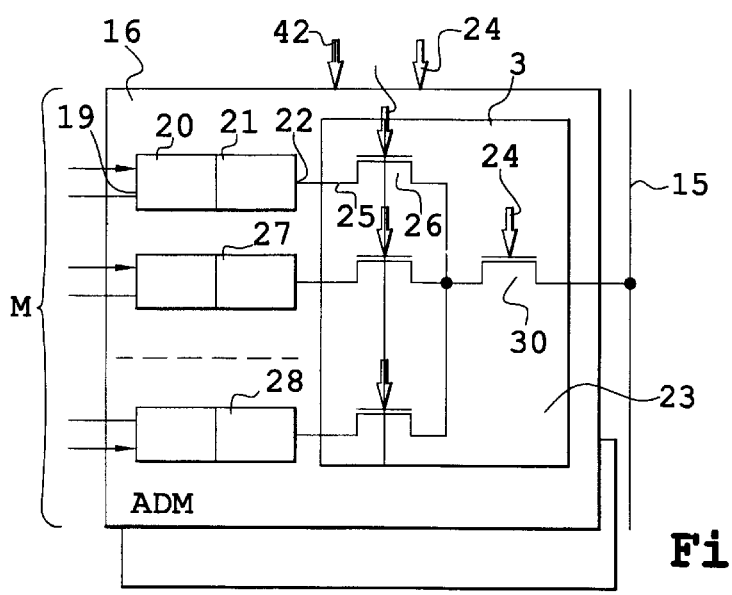
FIG. 2 is a block diagram of an add and drop multiplexer, an essential distribution and switching unit of the invention.

FIG. 2 is a simplified representation of the add function of the multiplexer 16. The multiplexer 16 has M inputs-outputs (M is equal to 63 in the preferred embodiment). At each input-output, in particular at the input-output 19, is a set of registers 20–21 forming a first in/first out stack. An output 22 of the registers is connected to the ring 15 via a switching circuit 23 receiving an instruction 24. The output 22 is connected to the ring 15 by a link 25, for example. Simplistically, the link 25 includes a series-connected transistor 26. When the transistor 26 is turned on, the content of the register 21 is transmitted to the ring 15. In this case, the instructions 24 are such that other registers 27 and 28 of the multiplexer 16, which correspond to other inputs of the multiplexer, are not connected to the ring 15. The information frame conveyed by the ring 15 is therefore the overflow of information from the registers 21, 27 and 28 at a rate imposed on the various switches of the switching circuit 23 by the instructions 24.

FIG. 2 also shows the add function of a multiplexer, when information from the inputs-outputs 19 is injected into the ring 15. In practical terms, the ring is a simple electrical connection (referred to ground) between the multiplexers it includes. However, the multiplexers 16 are of course of the duplex type and reversible. In practise, they are adopted to add data to and drop data from the ring 15. The operation is exactly the same and the only modification is to the registers 20, 21, 27 and 28, which operate in the opposite direction. If other techniques are used to implement the multiplexers 16, the registers 20, 21, 27 and 28 are bidirectional.

If a user of the equipment unit 1, a call from whom terminates at a modem 8 connected to the multiplexer 16, requests connection to another user connected to another modem 29 (see FIG. 1) connected to the same multiplexer 16, a control circuit 10 produces control signals 24 that cause the multiplexer 16 to drop bits in the frame circulating on the ring 15. In this way two users who are near each other can exchange information at a high bit rate without activating all the switching circuits of the exchange 7, described later. If required, in this case, at the multiplexer 16, the ring 15 is really connected to the multiplexer 16 only for signals which should terminate at another multiplexer 17 or 18 on the same ring or at another access unit 13 or 14 in the some exchange 7 or at an exchange other than the exchange 7. In this case, the switching circuit 23 includes other switching circuits, simplistically symbolized by the transistor 30 (see FIG. 2), for connecting add channels to drop channels at the level of the multiplexer 16 itself.

From the practical point of view, it is sufficient to connect to the multiplexer 16 users whose lines 4 terminate at the modems 8 and 29 which are near each other or possibly if traffic between them has been assessed as frequent.

Other users, for example users geographically near the user of the equipment unit 1, are connected by their modem to the multiplexers 17 and 18 which like the multiplexer 16 are part of the ring 15. In this case, the instructions 24 issued in the circuit 10 bring about simple exchange of the add and drop channels of the multiplexers 16, 17 and 18, using only the ring 15. In this way the primary multiplexers 16 through 18 organize traffic internal to the primary ring 15 in accordance with the invention.

The ring 15 also has an input-output port 31. The port 31 includes circuits analogous to those of the multiplexers 16 through 18. It essentially includes a switch of the same type as the switch 23 so that the ring 15 carries binary information from or to a link 311 with a connection-switching stage 32. The bit rate at the port 31 is preferably that of the ring 15. It is in the range from 25% to 50%, and preferably ⅓, of the potential total bit rate of all the multiplexers of the ring. The choice to implement the rings 15 with three add and drop multiplexers and one port 31 is based on a statistical study. According to that study, not all users of the access unit 12 will invoke it at the same time. It is therefore not necessary for the equipment that it contains to be capable of routing as many simultaneous calls as potentially might arise.

Like the access unit 12, the stage 32 includes a ring network, i.e. a secondary ring 33 of secondary add and drop multiplexers 34. An input-output of the multiplexer 34 is therefore connected to the line 311. Another input-output of the multiplexer 34 is connected by a channel 35 to a port of another access unit, for example the access unit 13. A multiplexer 34 can therefore be connected to a plurality of access units 12 to 13. Other access units of the exchange 7 are connected to other secondary multiplexers such as the multiplexers 36 and 37. In a practical example, if there are 48 access units such as the units 12 through 14, they are grouped 12 at a time to form a ring 33 with four secondary add and drop multiplexers such as the multiplexers 34, 36 or 37. The internal switching circuits of three multiplexers 34, 36 and 37 are also controlled by the instructions 24.

Figure 3:
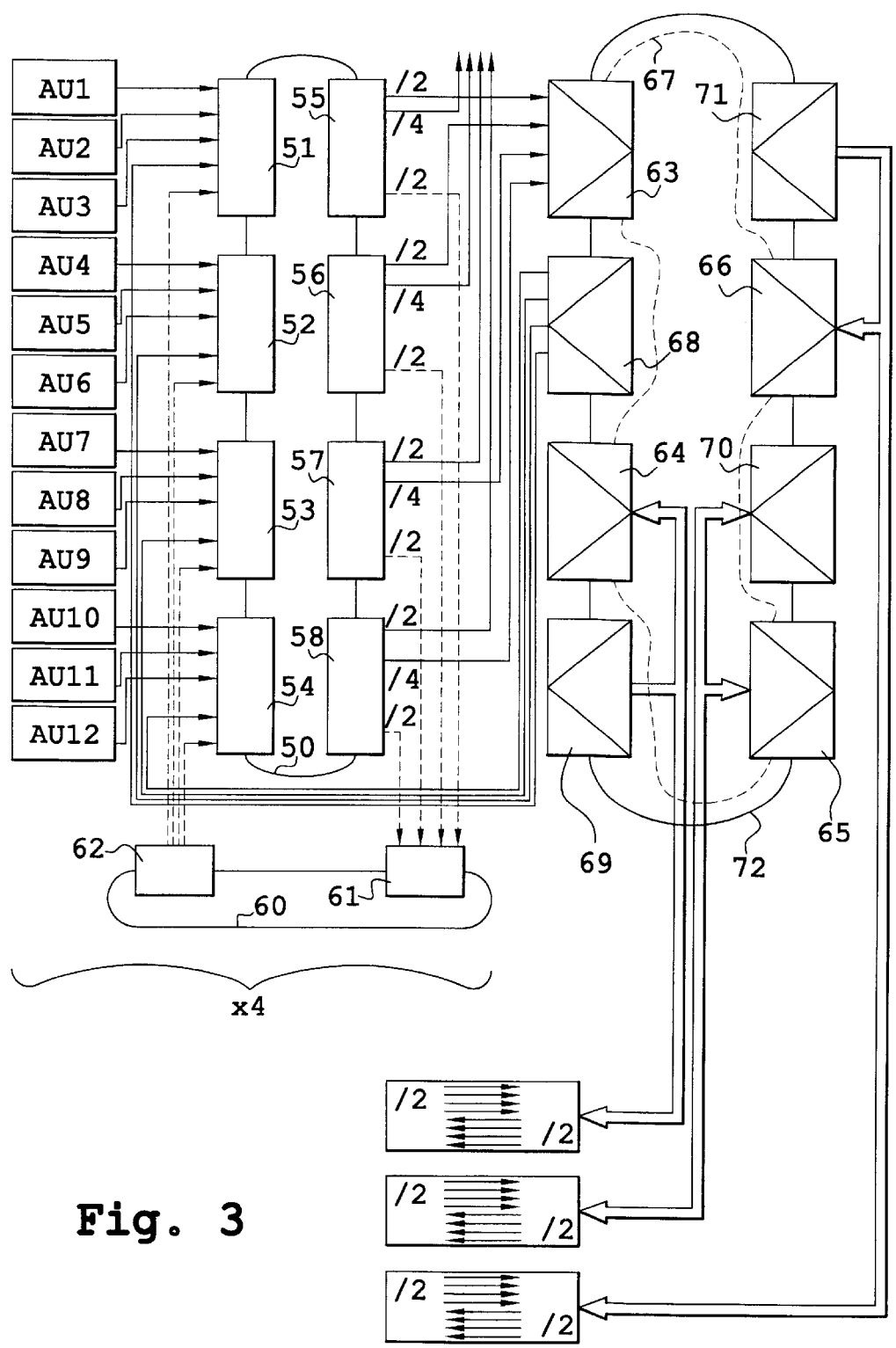
FIG. 3 is a block diagram of one particular architecture of a connection-switching stage of the invention.

FIG. 3 shows a detailed implementation of one particular example of the stage 32. It is described later.

The exchange 7 also includes the control circuit 10 which receives signaling via the channel 9 referred to above. The circuit 10 includes a first circuit 38 for concentrating received signaling. The circuit 38 is connected to a switching control circuit 39 which is responsible for managing the telephone numbers and entitlements of users. The circuit 39 is also responsible for routing, i.e. for defining the best path to be set up to organize the call between users to be interconnected. The switching control circuit 39 con also produce information needed for billing calls. The switching control circuit 39 then produces routing signals corresponding to the routing it has performed and which are transmitted to an interpretation circuit 40. At the exchange 7, the interpretation circuit 40 interprets the routing signals in order to produce switching instructions 24 fed to the various multiplexers 16 through 18, 34, 36, 37 and more generally to the access units 12 through 14 and to the connection-switching stage 32 so that the links are set up correctly from the electrical point of view.

As explained below, the switching control circuit 39 transmits signaling to another exchange so that the other exchange routes information to its addressee, connected to the other exchange. The circuit 10 includes a logistical circuit 41 providing hardware supervision of the control, configuration and allocation of resources of the exchange 7. The circuit 41 is also connected to the switching control circuit 39. The circuit 41 produces instructions 42 for configuring the various equipment units, modems 8 and 29, or multiplexers 16 through 18, etc. The proposed differentiation between the circuits 39, 40 and 41 is related to only one particular architecture. However, any other architecture is feasible provided that it can produce the instructions 24 and 42 for the exchange 7.

In practise, in order to produce the appropriate instructions 24, the circuit 39 is adapted to recognize that the destination of a message from the modem 8, for example, is one of the modems 29 connected to the same multiplexer as the modem 8 or to another multiplexer in the same ring 15. In this case, the circuit 40 produces instructions 24 so that the add multiplexer to which the message relates places the data blocks in the frame circulating on the ring 15 at a particular temporal position and causes the same multiplexer, or another multiplexer on the some ring, if appropriate, to drop them at the same temporal position. In this way switching is dynamic, even at the local level.

The link 311 between an access unit 12 and the connection-switching stage 32 is a very high bit rate link. In one example, like the links between the add and drop multiplexers 16, 17 and 18 of the ring 15, it is a 155 Mbit/s STM-1 (Synchronous Transport Module, level 1) SDH (Synchronous Digital Hierarchy) link capable of carrying 63×2 Mbit/s channels in addition to synchronization signals. The link 311 is an electrical or fiber optic link, depending on the distance between the access unit 12 through 14 and the stage 32.

The connection-switching stage 32 is therefore at a higher level in the hierarchy than the switching stage consisting of the access units 12 through 14. In a first application, the stage 32 operates as one of the access units 12 through 14. In this case, however, it redistributes to a given access unit, for example access unit 13, information from another given access unit, for example access unit 12. Given that in one embodiment the multiplexer 34 is capable of receiving 12 links like the link 311, a multiplexer 34 is at least 12 times faster, for example 16 times faster, i.e. more powerful, than one of the multiplexers 16 through 18. It operates in the same way, however.

The ring 33 of the stage 32 differs in another way from the ring 15 of the unit 12. It has a plurality of add and drop ports 43 through 45. The port 44 connects the exchange 7 to a transit center 46 whose structure can be of the same type as that of the exchange 7. The ring 33 can be connected by a port 43 or 45 to other exchanges or other transit centers. Links 47 through 49 between the exchange 7 and the other exchanges, or transit centers, are very high bit rate links. In one example they are fiber optic SDH links with a bit rate in the order of 2.5 Gbit/s or higher. In practise, such links are capable of handling around 1000 simultaneous 2 Mbit/s calls.

FIG. 3 shows one embodiment of the stage 32. Although it is bidirectional, its operation is explained here for one communication direction. The complementary explanation can be deduced from the explanation as given. The stage 32 includes a ring 50 with four add multiplexers 51 through 54 and four drop multiplexers 55 through 58. The multiplexers 51–54 each have three add channels connected to three access units, for example the units AU1, AU2 and AU3 in the case of the multiplexer 51. The multiplexers 51–54 optionally also have another add channel connected to the outputs of the drop multiplexers 55–58 via a ring 60 including two multiplexers, an add multiplexer 61 and a drop multiplexer 62. The connections between the ring 60 and the ring 50 are shown in dashed line to indicate that they are optional. If they are implemented, these connections of the ring 60 to the ring 50 each carry two 155 Mbit/s STM-1 channels, for example, which could be in parallel. The ring 60 can be used to organize the switching of calls between users connected to the same ring 50 and therefore connected to the same access units AU1 through AU12.

For access to other exchanges 7, the multiplexers 55 through 58 have outputs which in one example comprise four 155 Mbit/s STM-1 channels, which can be in parallel. Here there are four outputs each with four channels.

The ring 50, complemented where applicable by the ring 60, is implemented four times over to serve the 48 access units AU1 through AU48. A ring 50, complemented where applicable by a ring 60, forms one module. The drop multiplexers 55–58 of the ring 50 are additionally connected to add channels of add multiplexers 63 through 66. The add multiplexers 63–66 can be connected together in a ring 67 (shown in dashed line). The add multiplexers 63–66 are preferably connected to drop multiplexers 68 through 71 via a common tertiary ring 72 interconnecting the module. In this case the ring 72 organizes switching between users connected to the ring 50 and users connected to another ring of the same type as the ring 50. In one example, the add and drop connections of the rings 50 and the ring 72 each carry two basic rate access channels of a link between an access unit and a ring 50, i.e. two 155 Mbit/s STM-1 channels in the case considered previously, which can be in parallel.

When information has to be transmitted from an exchange 7 to a transit center 46 or another exchange, signaling produced by the switching control circuit 39 of the exchange 7 con be routed via a dedicated link 73 as shown in FIG. 1. However, given that the links 47 through 49 are available, it may be preferable in one of the multiplexers, for example the multiplexer 37, for the connection-switching stage 32 to reserve one input-output for the signaling, which then reaches a signaling concentrator circuit 74, of the same type as the circuit 38, as intended, but via the very high bit rate link 48. In this case, the signaling is preferably sent in advance so that a circuit 75 in the other exchange, equivalent to the circuit 10, con prepare the necessary switching instructions 24 for that exchange.

The invention is noteworthy in that switching is hierarchical. The links 47 through 49 exclusively transmit information to other exchanges, and not information that could have been exchanged within the exchange 7 itself. It is further noteworthy in that all its switching units are formed in the some manner: a network of add and drop multiplexers interconnected by a ring and further connected by at least one port to at least one other switching unit. It is also noteworthy in that the circuit 10 which controls the multiplexers of the access units and of the connection-switching stage on the basis of signaling transmitted by users performs the dynamic switching.

Moreover, the infrastructure consisting of the copper wire pairs 4 and the fiber optic links 47 through 49 already exists in telephone networks. Note further that, if a user requires access at a bit rate in the order of several tens of megabits per second, even 155 Mbit/s, that user's equipment unit could be connected by means of optical fibers directly (i.e. without using modems) to an add and drop multiplexer of an access unit.

What is claimed is:

1. A circuit switching system in a telecommunication network, including:
   an exchange,
   a set of access units, each of said access units having its own primary ring of add and drop primary multiplexers, each of said add and drop primary multiplexers being connected to user equipments, and
   control means for controlling said primary multiplexers, said control means including:
      means for receiving signaling transmitted by a user equipment connected to said access units, and
      means for producing routing signals corresponding to said signaling, said routing signals constituting control signals for said primary multiplexers of said set of access units for setting up a connection between said subscriber equipment and another subscriber equipment.

2. A circuit switching system in a telecommunication network, including:
   an exchange,
   a set of access units, each of said access units having its own primary ring of add and drop primary multiplexers, each of said add and drop primary multiplexers being connected to user equipments, and
   control means for controlling said primary multiplexers, said control means including:
      means for receiving signaling transmitted by a user equipment connected to said access units, and
      means for producing routing signals corresponding to said signaling, said routing signals constituting control signals for said primary multiplexers of said set of access units for setting up a connection between said subscriber equipment and another subscriber equipment,
   further including a first high bit rate modem on a users premises and a second high bit rate modem in said exchange of said telecommunication network, wherein said second modem is connected to said first modem by a copper line of said telecommunication network and one of a plurality of inputs-outputs of a primary multiplexer is connected to said second modem.

3. The device claimed in claim 2 wherein the high bit rate of said high bit rate modems is 2 Mbit/s.

4. A system as claimed in claim 1 including three primary multiplexers and one port in said primary ring of an access unit.

5. A circuit switching system in a telecommunication network, including:
   an exchange,
   a set of access units, each of said access units having its own primary ring of add and drop primary multiplexers, each of said add and drop primary multiplexers being connected to user equipments, and
   control means for controlling said primary multiplexers, said control means including:
      means for receiving signaling transmitted by a user equipment connected to said access units, and
      means for producing routing signals corresponding to said signaling, said routing signals constituting control signals for said primary multiplexers of said set of access units for setting up a connection between said subscriber equipment and another subscriber equipment,
   said primary ring of an access unit including three primary multiplexers and one port, and
   wherein said access unit includes a port whose bit rate is in the range from 25% to 50% of, and preferably equal to $\frac{1}{3}$ of, the potential total bit rate of said set of multiplexers of said ring.

6. A circuit switching system in a telecommunication network, including:
   an exchange,
   a set of access units, each of said access units having its own primary ring of add and drop primary multiplexers, each of said add and drop primary multiplexers being connected to user equipments, and
   control means for controlling said primary multiplexers, said control means including:

means for receiving signaling transmitted by a user equipment connected to said access units, and means for producing routing signals corresponding to said signaling, said routing signals constituting control signals for said primary multiplexers of said set of access units for setting up a connection between said subscriber equipment and another subscriber equipment, wherein said exchange further includes a connection-switching stage including a very high bit rate secondary ring of secondary add and drop multiplexers, one input-output of one of said secondary multiplexers is connected to a port of said primary ring of an access unit and said routing signals constitute control signals of said primary and secondary multiplexers.

7. A system as claimed in claim 6 wherein said very high bit rate secondary ring includes a very high bit rate port for connecting an exchange to another exchange or to a call transit center.

8. A system as claimed in claim 7, further including a fiber optic link connected to said very high bit rate port.

9. A system as claimed in claim 7, further including, for transmitting signaling to another exchange or to a call transit center, a circuit for passing said signaling through said very high bit rate port.

10. The device claimed in claim 6 wherein a secondary multiplexer is more powerful than a primary multiplexer.

11. A circuit switching system in a telecommunication network, including:

an exchange;

a set of access units, each of said access units having its own primary ring of add and drop primary multiplexers, each of said add and drop primary multiplexers being connected to user equipments, and control means for controlling said primary multiplexers, said control means including:

means for receiving signaling transmitted by a user equipment connected to said access units, and means for producing routing signals corresponding to said signaling, said routing signals constituting control signals for said primary multiplexers of said set of access units for setting up a connection between said subscriber equipment and another subscriber equipment, wherein said telecommunication network is characterized has having a plurality of exchanges, said plurality of exchanges being arranged in a hierarchy, and said exchange of said circuit switching system being one exchange of said plurality of exchanges of said telecommunication network, and wherein when a connection is set up between two users, and both user have equipment connected to add and drop primary multiplexers of said exchange of said circuit switching system, said routing signals control said add and drop primary multiplexers to locally route the connection within said exchange, whereby the connection is not routed via an exchange at a higher level of hierarchy in said telecommunication network.

12. A system as claimed in claim 11, wherein when a connection is set up between the two users, and both user have equipment connected to add and drop primary multiplexers of one of said access units, said routing signals control said add and drop primary multiplexers to locally route the connection within said one of said access units.

13. A system as claimed in claim 12, wherein when a connection is set up between the two users, and both user have equipment connected to a same add and drop primary multiplexer of said one of said access units, said routing signals control the add and drop primary multiplexer to locally route the connection within the add and drop primary multiplexer, whereby the connection is not routed via the primary ring of said one of said access units.

14. A system as claimed in claim 12, wherein one of the two users has equipment connected to a first add and drop primary multiplexer, and another of the two users has equipment connected to a second add and drop primary multiplexer, both said first add and drop primary multiplexer and said second add drop multiplexer being of said one of said access units, and wherein said routing signals control the first and second add and drop primary multiplexers to locally route the connection via only the primary ring of said one of said access units.

* * * * *